(12) United States Patent
Albert et al.

(10) Patent No.: US 10,481,841 B2
(45) Date of Patent: *Nov. 19, 2019

(54) METHODS AND SYSTEMS FOR PROVIDING A GRAPHICAL OVERLAY FOR LIMITING ACCESS TO A NETWORK

(71) Applicant: Xerox Corporation, Norwalk, CT (US)

(72) Inventors: Prince Gerald Albert, Webster, NY (US); Dheeraj Chaitanya Thotakura, Rochester, NY (US); Bernard Roch Heroux, Jr., Webster, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/158,926

(22) Filed: Oct. 12, 2018

(65) Prior Publication Data
US 2019/0235805 A1 Aug. 1, 2019

Related U.S. Application Data

(63) Continuation of application No. 15/880,884, filed on Jan. 26, 2018, now Pat. No. 10,114,595.

(51) Int. Cl.
G06F 15/00 (2006.01)
G06K 1/00 (2006.01)
G06K 15/00 (2006.01)
G06F 3/12 (2006.01)
H04N 1/00 (2006.01)

(52) U.S. Cl.
CPC .......... *G06F 3/1222* (2013.01); *G06F 3/1238* (2013.01); *G06F 3/1253* (2013.01); *G06F 3/1285* (2013.01); *H04N 1/00464* (2013.01); *H04N 1/00474* (2013.01); *H04N 1/00925* (2013.01); *H04N 2201/0094* (2013.01)

(58) Field of Classification Search
CPC .... G06F 3/1222; G06F 3/1238; G06F 3/1253; G06F 3/1285; H04N 1/00464; H04N 1/00474; H04N 1/00925; H04N 2201/0094
USPC ........................................ 358/1.1, 1.14, 1.13
See application file for complete search history.

(56) References Cited

U.S. PATENT DOCUMENTS 10,114,595 B1 * 10/2018 Albert .................. G06F 3/1204
2010/0153968 A1 6/2010 Engel
2017/0005970 A1 1/2017 Mital et al.

* cited by examiner

*Primary Examiner* — Douglas Q Tran
(74) *Attorney, Agent, or Firm* — Fox Rothschild LLP

(57) ABSTRACT

A print system includes a print device and a processor comprising programming instructions. The processor is configured to launch a first application that causes a display device to output a user interface via which a user may select a document to print via the print device. The user interface includes user interaction fields that, when actuated, will initiate actions that are unrelated to operation of the print device. The processor is further configured to launch a second application that causes the display device to generate and output a graphical overlay that is at least in part displayed over one or more of the user interaction fields to prevent the user from actuating the user interaction fields while presenting a user interaction field that permits the user to cause the print device to print a document.

21 Claims, 6 Drawing Sheets

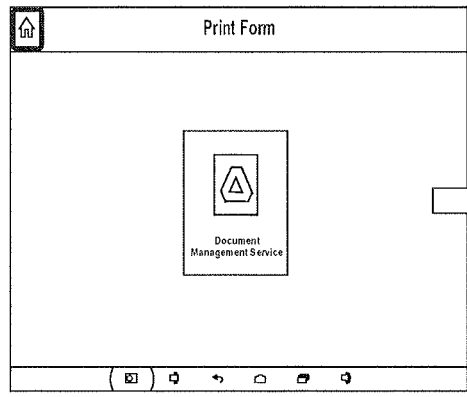
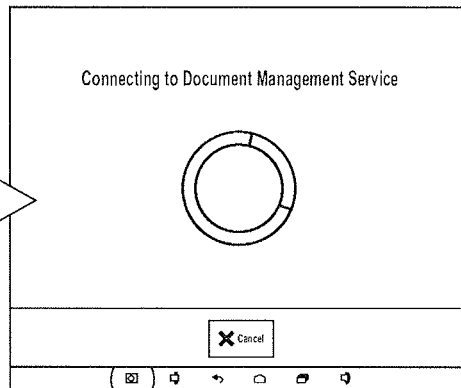
FIG. 3A       FIG. 3B
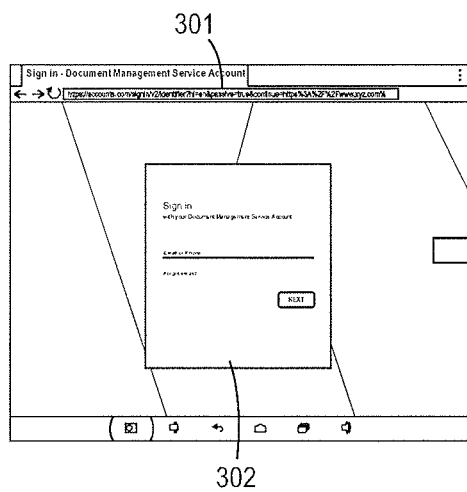
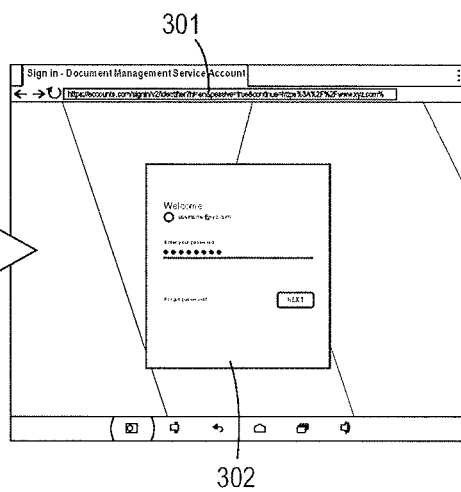
FIG. 3C       FIG. 3D

METHODS AND SYSTEMS FOR PROVIDING A GRAPHICAL OVERLAY FOR LIMITING ACCESS TO A NETWORK

RELATED APPLICATIONS AND CLAIMS OF PRIORITY

This patent application is a continuation of U.S. patent application Ser. No. 15/880,884, filed Jan. 26, 2018, the disclosures of which is fully incorporated into this document by reference.

BACKGROUND

With the ubiquity of portable electronic devices such as personal digital assistants, cellular telephones, and laptops, as well as increasing dependency on e-mail and other aspects of the internet, situations often arise in which a person will need to print or scan documents, photos, or the like. While public places may offer Internet access, these typically do not offer printing and other services that users may need. Kiosks may be configured to provide self-service public access to services such as printing and scanning in public areas.

While printing from such kiosks, in many instances, a user may need to access and/or download documents to be printed from cloud storage services (e.g., XEROX Docushare® GoogleDrive®, Dropbox®, MICROSOFT OneDrive®, etc.), and the delivery of documents using general-purpose web-browsers has become a practical requirement in such environments. Web browsers are typically flexible and open programs which aid the user in navigating the Internet, running programs or applets, and giving the user full control over what he/she is doing. However, for a kiosk system which is utilized by numerous users, providing access to the web may create problems because the control regions of the browser may have menu choices which permit a user to alter the settings of the browser. In a kiosk device where uniformity and predictability of use is essential to achieving self-service, having menu choices which permit modification of the desired settings poses significant problems. Moreover, a user can access any content accessible via the Internet which does not further the goal of the business which has established the kiosk and may cause system failure, hamper customer turnaround time, etc. As such, the user should not have full control and open access.

"Web wraps" may enable a kiosk to be limited to displaying only preset web pages. For example, a bookshop might provide a kiosk for accessing its on-line catalogue across the internet but block access to internet pages other than those within its own site. However, web wraps are ineffective if a user needs to access outside Internet pages to access or download documents and/or for authentication purposes.

This document describes a system that may address at least some of the issues described above.

SUMMARY

This disclosure is not limited to the particular systems, methodologies or protocols described, as these may vary. The terminology used in this description is for the purpose of describing the particular versions or embodiments only, and is not intended to limit the scope.

As used in this document, the singular forms "a," "an," and "the" include plural reference unless the context clearly dictates otherwise. Unless defined otherwise, all technical and scientific terms used herein have the same meanings as commonly understood by one of ordinary skill in the art. All publications mentioned in this document are incorporated by reference. All sizes recited in this document are by way of example only, and the invention is not limited to structures having the specific sizes or dimension recited below. As used herein, the term "comprising" means "including, but not limited to."

In an embodiment, a print system may include a print device and a processor comprising programming instructions. The system may be configured to launch a first application that causes a display device to output a user interface via which a user may select a document to print via the print device. The user interface may include user interaction fields that, when actuated, will initiate actions that are unrelated to operation of the print device. The system may also be configured to launch a second application that causes the display device to generate and output a graphical overlay that is at least in part displayed over one or more of the user interaction fields to prevent the user from actuating the user interaction fields while presenting a user interaction field that permits the user to cause the print device to print a document.

In certain embodiments, the system may, before launching the first application, launch a home application that causes the display device to display one or more document management service selection icons via which the user may select a document management service. The launching of the first application may be responsive to user selection of one of the document management service selection icons, and the user interface may be to the document management service that corresponds to the selected icon. Optionally, the document management service may be a remote service via which the user may select the document to print from a collection of stored documents.

In at least one embodiment, the print device may be a multifunction device that includes a scanner and the document management service may be a service to which the user may store documents. Optionally, the graphical overlay may permit the user to cause the multifunction device to scan a document and select a location of the document management service at which the scanned document will be stored. In such embodiments, the second application may cause in response to user selection of a scan function: the multifunction device to scan a physical document to an electronic scan file, and the system to transmit the electronic scan file to the document management service to be stored at the selected location.

Optionally, the system may, before launching the second application determine whether the user interface comprises a web application that includes the one or more user interaction fields that, when actuated, will initiate actions that are unrelated to operation of the print device. If so, the system may, launch the second application that causes the display device to generate and output the graphical overlay that is at least in part displayed over the one or more of the user interaction fields.

In at least one embodiment, the graphical overlay that is at least in part displayed over one or more of the user interaction fields to prevent the user from actuating the one or more user interaction fields is invisible to a user. Additionally and/or optionally, the graphical overlay at least partially obscures the one or more of the user interaction fields.

In an embodiment, launching the second application that causes the display device to generate and output the graphical overlay may include, via the second application, identifying regions of the user interface that include the one or more of the user interaction fields by consulting a look-up table that includes a description of the user interface.

In some embodiments, at least a portion of the graphical overlay that is displayed over one or more of the user interaction fields may include a substitute user interaction field that, when actuated, causes the system to close the first application and return to a home application.

In an embodiment, the user interaction field that permits the user to cause the print device to print a document retrieved from the remote service may be a user interaction field of the user interface output by the first application. Additionally and/or optionally, the user interaction field that permits the user to cause the print device to print a document retrieved from the remote service may be a user interaction field of the graphical overlay generated by the second application.

In at least one embodiment, the display device is included in a kiosk device.

BRIEF DESCRIPTION OF THE DRAWINGS

FIGS. 3A-3E illustrate an example sequence of user interfaces output by an application according to an embodiment.

DETAILED DESCRIPTION

The following terms shall have, for purposes of this application, the respective meanings set forth below:

A "computing device" or "electronic device" refers to a device that includes a processor and tangible, computer-readable memory. The memory may contain programming instructions that, when executed by the processor, cause the electronic device to perform one or more operations according to the programming instructions. Examples of electronic devices include personal computers, servers, mainframes, gaming systems, televisions, and portable electronic devices such as smartphones, personal digital assistants, cameras, tablet computers, laptop computers, media players and the like.

A "document" refers to a digital representation of a document such as a word processor file, a PDF file, or a bitmap file (e.g. TIFF, JPG, PNG files etc.) that is stored in a computer readable memory or a storage medium. A document file may be an electronic representation of a physical document that contains one or multiple pages. A document may also refer to the set of instructions or metadata that cause the document to be processed.

A "document processing service" refers to a service that can modify or otherwise process a document, for example, by performing print-related services, document repository services, scanning services, document management services, image processing services and/or the like.

A "kiosk" system refers to a physical structure that includes a display device and a computing device that includes and/or is in communication with at least one print device, such that the kiosk provides a self-service station for providing public access to document processing facilities (e.g., printing, scanning, etc.). It will be understood that a kiosk device in accordance with the disclosure could also be provided as a desktop computer or some other self-service system.

The term "print device" refers to a machine having hardware capable of reading a digital document file and using the information from the file and associated print instructions to print of a physical document on a substrate. Components of a print device typically include a print engine, which includes print hardware such as a print head, which may include components such as a print cartridge containing ink, toner or another print material, as well as a document feeding system configured to pass a substrate through the print device so that the print head can print characters and/or images on the substrate. In some embodiments, a print device may have additional capabilities such as scanning or faxing and thus may be a multifunction device.

Figure 1:
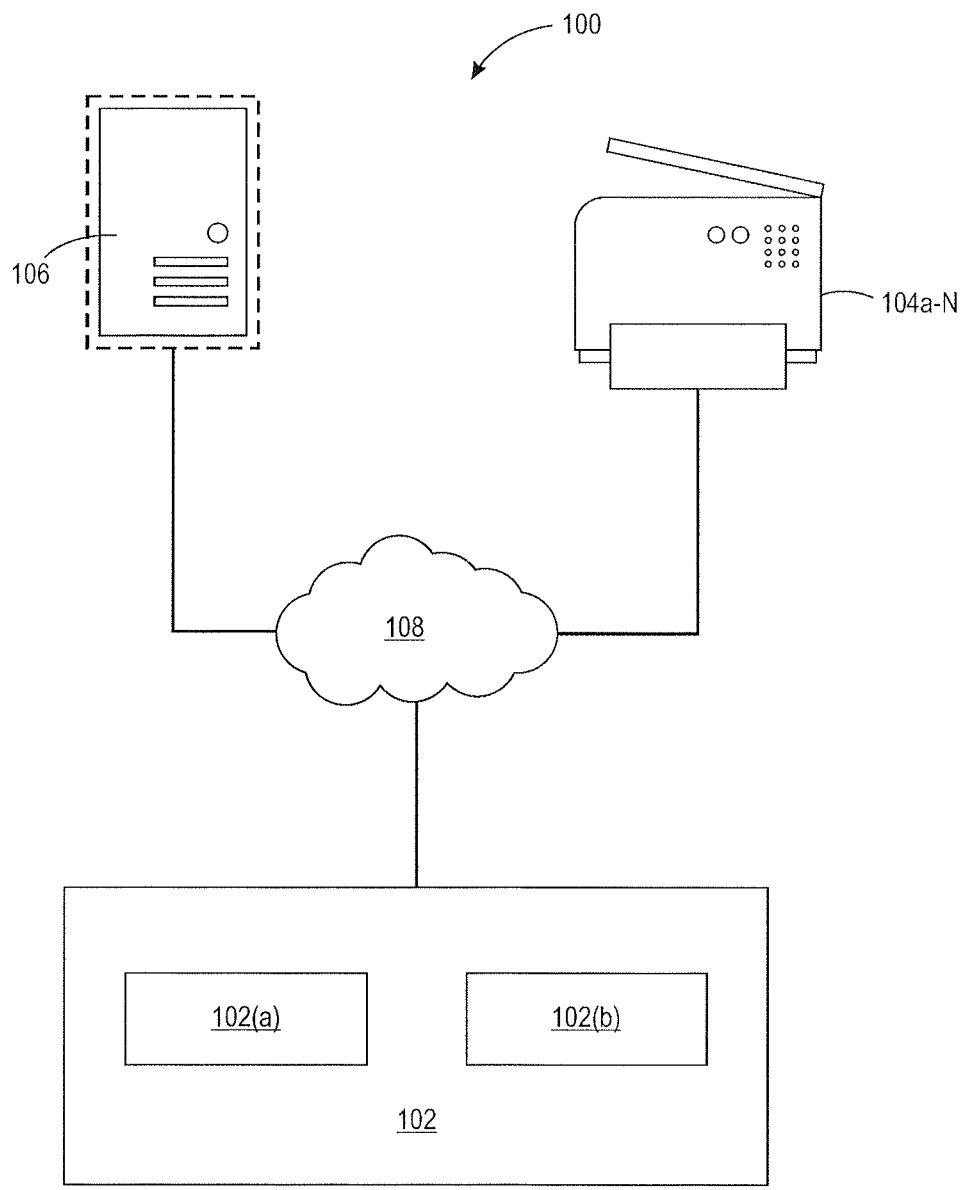
FIG. 1 illustrates an example system for limiting access to a network from a networked kiosk device according to an embodiment.

FIG. 1 illustrates an example system for limiting access to a network from a networked kiosk device according to an embodiment. As shown in FIG. 1, the system 100 includes a kiosk device 102 in communication with one or more print devices 104a-N such as printers, scanners, multifunction devices (MFDs), copiers, or the like via a communication network 108. In certain embodiments, a print device may be a part of the kiosk device 102. The kiosk device 102 may also be in communication with one or more remote services 106 via a communication network 108. A communication network 108 may be a local area network (LAN), a wide area network (WAN), a mobile or cellular communication network, an extranet, an intranet, the Internet and/or the like. The print devices 104a-N may receive instructions from the kiosk device 102 and perform various functions. The remote services 106 may include, without limitation, document management services, cloud storage systems or servers, or the like (e.g., XEROX Docushare® GoogleDrive®, Dropbox®, MICROSOFT OneDrive®, etc.) for storing and/or managing user documents. The document management services may provide cloud storage by accepting one or more standard web-based communication protocols for storing and retrieving files. For example, the File Transfer Protocol ("FTP") may be used to upload a file to a cloud storage server, and the Hypertext Transfer Protocol ("HTTP") may be used to download a file from a cloud storage server. Users may also access documents directly at the kiosks, such as by using a USB flash drive.

In an embodiment, the kiosk device 102 may be a self-service station for providing public access to document processing facilities or services (e.g., printing, scanning, etc.) via one or more print devices 104a-N. In an embodiment, the kiosk device 102 may include, without limitation at least one display device 102(a) and at least one computing device 102(b). In some embodiments, the display device 102(a) may be configured to display user interface (UI) elements to interact with users, as well as data requested for display by users. The display device 102(a) may be associated with input devices such as, without limitation, keyboard and pointing devices, and/or can be a touch sensitive display that is also a graphical user interface (GUI) input device.

Figure 2:
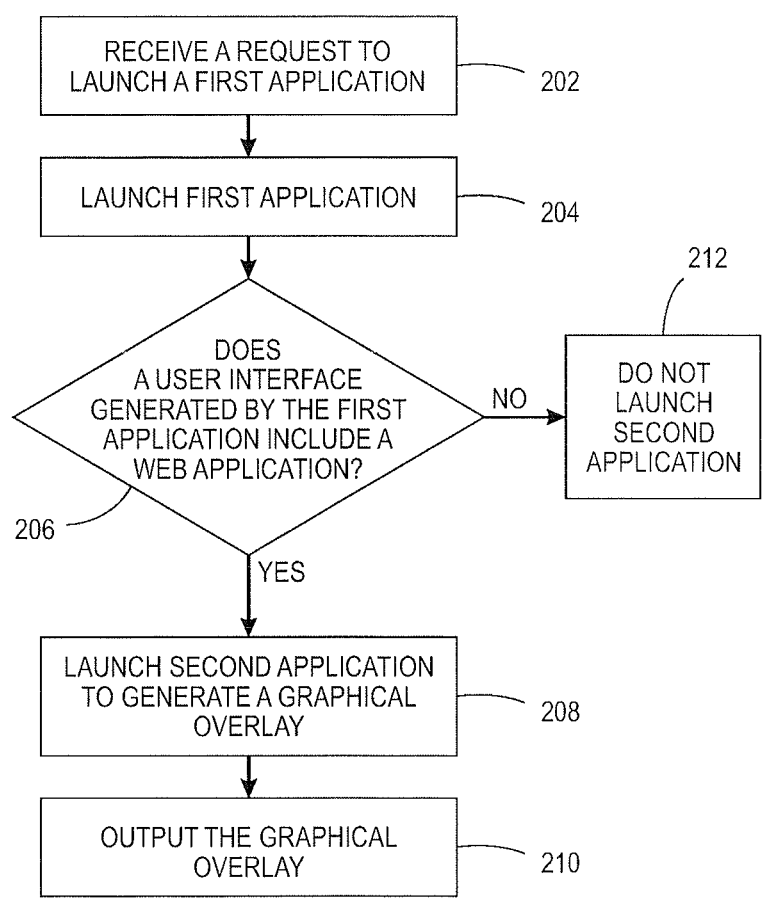
FIG. 2 illustrates an example method for limiting access to a network from a networked kiosk device according to an embodiment.
Figure 5:
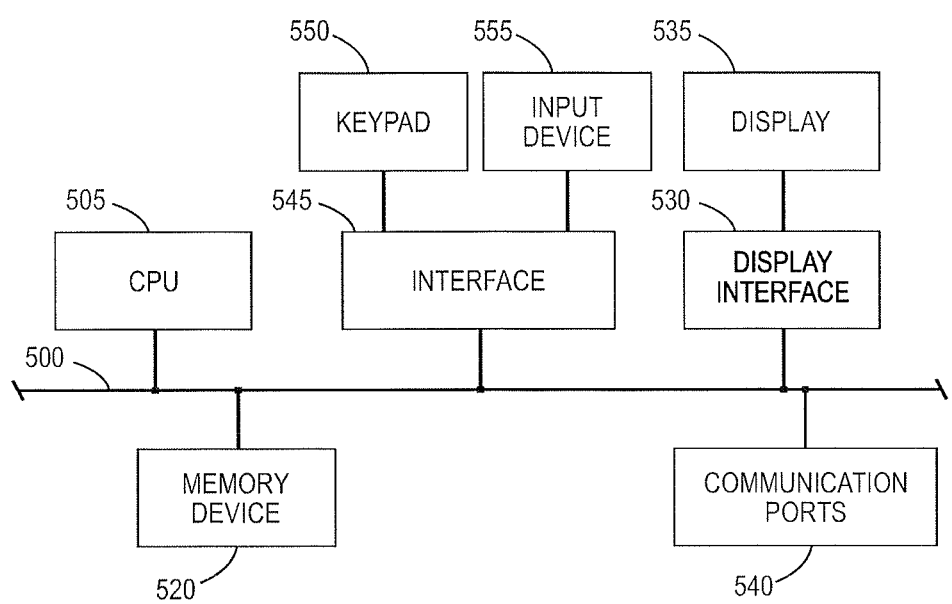
FIG. 5 illustrates a block diagram of example hardware that may be used to contain or implement program instructions according to an embodiment.

In FIG. 2, methods for accomplishing various tasks in the systems disclosed in FIGS. 1 and 5 are provided. While the method 200 is described for the sake of convenience and not with an intent of limiting the disclosure as comprising a series and/or a number of steps, it is to be understood that the process does not need to be performed as a series of steps and/or the steps do not need to be performed in the order shown and described with respect to FIG. 2, but the process may be integrated and/or one or more steps may be performed together, or the steps may be performed in the order disclosed or in an alternate order.

In some embodiments, a system for limiting access to a network from a networked kiosk device may receive a user request (202) to launch a first application on the display device of a kiosk device. For example, a user may click on an icon displayed on the display device of the kiosk device corresponding to the first application. In an embodiment, the first application may be configured to output one or more user interfaces for enabling the user to access a remote service such as a document management service. Examples of the first application may include, without limitation, a print from cloud storage application, a scan to cloud storage application, or the like. The one or more user interfaces may be configured to provide prompts to a user, receive information from a user for authenticating the user, display a list of print jobs or documents, allow the user to select a print job or a document for processing, allow the user to scan a document for storage, and/or the like. One or more of the user interfaces output by the application may include a web application. In response to receiving the request, the system may launch (204) the first application.

In an embodiment, the system may receive the user request to launch the first application (202) by first launching a home application that causes the display device to display one or more remote service selection icons. A user selection of a remote service (e.g., a print from cloud storage application, a scan to cloud storage application, or the like) via such icons may be indicative of the user request to launch the first application. Hence, the first application may be launched (204) in response to user selection of one of the remote service selection icons on the home application. The user interfaces may enable the user to access the remote service that corresponds to the selected icon. In an embodiment, the system may launch the home application in response to, without limitation, user selection of an icon the display device corresponding to the home application, detecting user proximity to the kiosk device, switching on of the kiosk device, other user actions (such as selecting a service provided by the kiosk device, swiping of a credit card, user login related activity), or the like.

Alternatively and/or additionally, the system may launch the first application automatically in response to, without limitation, detecting user proximity to the kiosk device, switching on of the kiosk device, user selection of a function corresponding to the use of a print device of the kiosk device, swiping of a credit card, user login related activity, or the like.

Upon launch of the first application, the system may determine (206) whether one or more of the user interfaces output by the first application include a web application (e.g., web browser, email, etc.) where the web application includes one or more control regions. In an embodiment, a user interface may include one or more web clients or applications to allow a user to interact with a remote service. For example, a web application may include a web browser including Internet Explorer or Firefox, an email application such as Outlook, or the like. In an embodiment, the web application may be configured to open a web page provided by a remote service for authenticating a user, displaying a list of print jobs or documents, allowing the user to select a print job or document for processing, and/or the like.

Such web application based user interfaces may include content regions that display content, and control regions that display web application controls. In an embodiment, the content regions may include user interaction fields that allow a user to select and/or initiate document processing services with respect to the displayed content. For example, the user interaction fields in the content regions may allow a user to select, transmit, and/or download a document for processing (e.g., printing, copying, etc.). In an embodiment, the control regions of the web application based user interfaces allow a user to perform certain operations that are unrelated to the document processing services provided by the kiosk device. For example, the control regions may include user interaction fields for performing operations on the web application itself such as, without limitation, change content of the web application; change browser settings; change default settings relating to the browser, search page, etc.; change security settings; hyperlinks for enabling navigation to a different web application; or the like. For example, an email application may have a user interface that includes a content region that displays the content of an email, as well as a control region that includes reply, forward, and delete buttons. A web browser may display the content of a web page in a content region, and may display, in a control region, various user interaction fields or controls (e.g., a navigation bar for allowing the user to navigate web pages or to determine information about a particular web page).

Figure 3E:
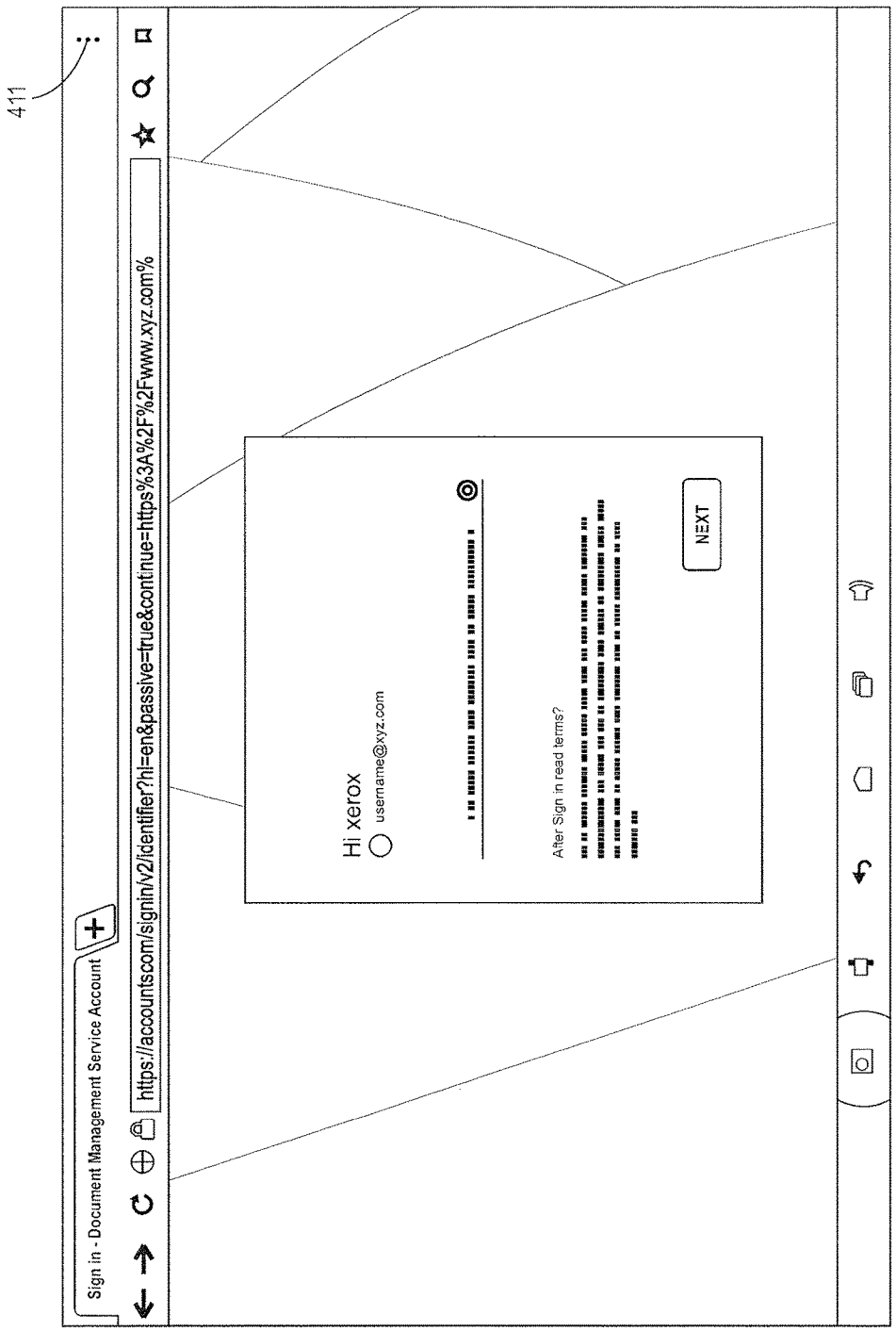

FIGS. 3A-3E show an example sequence of user interfaces output by an application that a user would interact with to access a document management service. For example, the system may receive a request to launch an application to access a desired document management service, an icon to which is displayed on the display device of the kiosk device (FIGS. 3A and 3B). The system may launch the application in response to the request (FIG. 3B). Upon launch, the application may provide one or more user interfaces for authentication of the user (FIGS. 3C and 3D), where the user interfaces include a web application (i.e., a web browser). The application may also provide a user interface to the user for interacting with the document management service (FIG. 3E), which also includes a web browser. As shown in FIGS. 3C-3E, the web application (i.e., the web browser) may display the content of a web page in a content region (302), and may display, in a control region (301), a navigation bar for allowing the user to navigate web pages, change browser settings, change security settings, to determine information about a particular web page, etc.

In response to determining that one or more of the user interfaces output by the first application include a web application, the system may launch a second application that causes the display device of the kiosk device to generate a graphical overlay (208) over portions of the one or more user interfaces that include the web application. The second application may generate the graphical overlay using any now or hereafter known methods. For example, the second application may use a "draw over other apps" tool provided in an Android® system to generate the graphical overlay.

In an embodiment, at least a portion of the generated graphical overlay may be displayed over one or more control regions of the user interfaces output by the first application such that a user may be blocked from interacting with various user interaction fields in those control regions. In an embodiment, the graphical overlay may be a transparent overlay that is invisible to a user i.e., a user may see the underlying control regions and user interaction fields but may not interact with them. In other embodiments, the graphical overlay may completely hide and/or may partially obscure the underlying control regions and user interaction fields such that the user may not interact with them. A user may still interact with one or more user interaction fields in the content regions of the user interfaces, for example, to select and/or initiate document processing services with respect to the displayed content. Optionally, the graphical overlay at least a portion of the graphical overlay that is displayed over the control regions may include a substitute user interaction field that, when actuated, may allow a user to select and/or initiate document processing services with respect to the displayed content.

In certain embodiments, to generate the graphical overlay (step 208), the second application may identify the control regions of a web application by consulting a look up table that includes various web applications and their corresponding control regions and locations. In some embodiments, the second application may identify the control regions by consulting a blacklist and/or whitelist of web applications that may be accessible using hyperlinks on a user interface.

At 210 the system may output the graphical overlay to be displayed over one or more control regions of a user interface that include the web application.

In response to determining that none of the user interfaces output by the first application include a web application, the system does not launch the second application (212).

Figure 4:
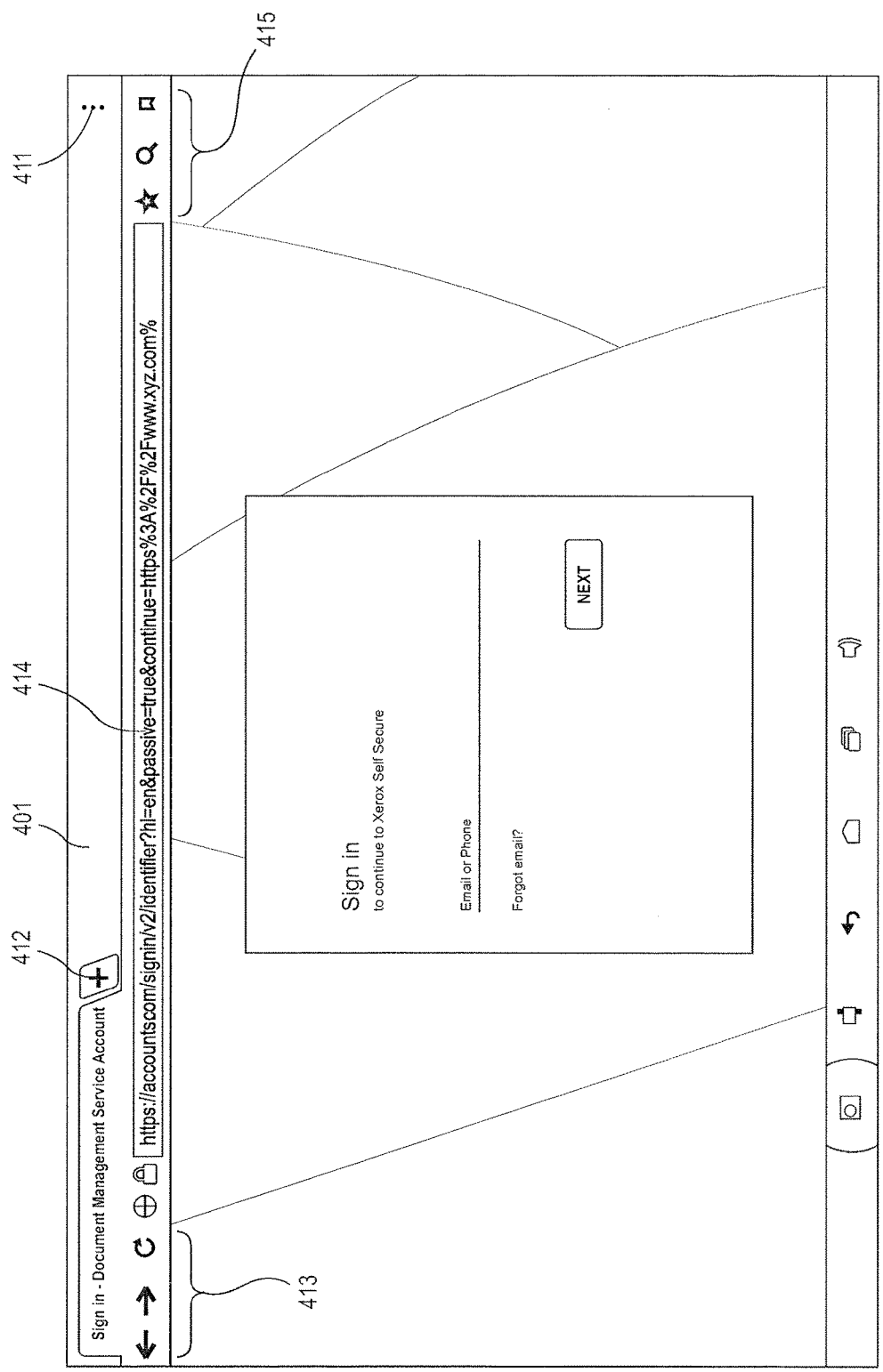
FIG. 4 illustrates an example graphical overlay according to an embodiment.

FIG. 4 illustrates an example graphical overlay 401 generated to cover various control regions in a browser application based user interface used to authenticate a user for accessing documents stored in a document management service. As shown in FIG. 4, the graphical overlay 401 is configured to hide the control regions corresponding to the address bar and the navigation bar in the browser application such that various user interaction fields in the control regions become inaccessible. These user interaction fields include, the settings field 411; the new tab field 412; the front, back and reload buttons 413; the address bar 414; and the bookmarks, search, and favorites icons 415. It will be understood to those skilled in the art that while FIG. 4 illustrates a single graphical overlay 401 that covers all the user interaction fields, the disclosure is not so limiting and any number of graphical overlays may be generated.

In various embodiments, the generated graphical overlay may be terminated if, for example, the user exits the first application, the second application determines that there is no user activity on a user interface output by the first application for a threshold period of time, upon completion of a document processing service task associated with the first application, upon payment relating to a document processing service task associated with the first application, or the like. In an embodiment, at least a portion of the graphical overlay that is displayed over the control regions may include a substitute user interaction field that, when actuated, may close the first application and terminate the graphical overlay. It should be noted that termination of the graphical interface is concurrent with the system exiting the user interface that includes output by the display device upon launch of the first application and that includes the web application. In other words, the system does not output a user interface that includes a web application without a graphical overlay. In certain embodiment, termination of the graphical interface may lead the system closing the first application, and the display device may display the icon corresponding to the first application (e.g., in the home application).

FIG. 5 depicts an example of internal hardware that may be included in any of the electronic components of the system, such as the kiosk device, the print device, or the remote services and/or hardware that may be used to contain or implement program instructions. A bus 500 serves as the main information highway interconnecting the other illustrated components of the hardware. CPU 505 is the central processing unit of the system, performing calculations and logic operations required to execute a program. CPU 505, alone or in conjunction with one or more of the other elements disclosed in FIG. 5, is an example of a processor as such term is used within this disclosure. Read only memory (ROM) and random access memory (RAM) constitute examples of non-transitory computer-readable storage media 520, memory devices or data stores as such terms are used within this disclosure.

Program instructions, software or interactive modules for providing the interface and performing any querying or analysis associated with one or more data sets may be stored in the memory device 520. Optionally, the program instructions may be stored on a tangible, non-transitory computer-readable medium such as a compact disk, a digital disk, flash memory, a memory card, a USB drive, an optical disc storage medium and/or other recording medium.

An optional display interface 530 may permit information from the bus 500 to be displayed on the display 535 in audio, visual, graphic or alphanumeric format. Communication with external devices may occur using various communication ports 540. A communication port 540 may be attached to a communications network, such as the Internet or an intranet.

The hardware may also include an interface 545 which allows for receipt of data from input devices such as a keypad 550 or other input device 555 such as a touch screen, a remote control, a pointing device, a video input device and/or an audio input device.

It will be appreciated that various of the above-disclosed and other features and functions, or alternatives thereof, may be desirably combined into many other different systems or applications or combinations of systems and applications. Also that various presently unforeseen or unanticipated alternatives, modifications, variations or improvements therein may be subsequently made by those skilled in the art which are also intended to be encompassed by the following claims.

What is claimed is:

1. A print system comprising:
   a print device;
   a processor; and
   a computer-readable storage medium comprising one or more programming instructions that, when executed, will cause the processor to:
      launch a first application that causes a display device to output a user interface via which a user may select a document to print via the print device, wherein the user interface includes one or more user interaction fields that, when actuated, will initiate actions that are unrelated to operation of the print device, and
      launch a second application that causes the display device to generate and output a graphical overlay that is at least in part displayed over one or more of the user interaction fields to prevent the user from actuating the one or more user interaction fields while presenting a user interaction field that permits the user to cause the print device to print a document.

2. The system of claim 1, further comprising additional programming instructions that are that, when executed, will cause the processor to:
   before launching the first application, launch a home application that causes the display device to display one or more document management service selection icons via which the user may select a document management service; and wherein the launching of the first application is responsive to user selection of one of the document management service selection icons, and the user interface is to the document management service that corresponds to the selected icon.

3. The system of claim 2, wherein the document management service is a remote service via which the user may select the document to print from a collection of stored documents.

4. The system of claim 3, wherein:
the print device is a multifunction device that comprises a scanner; and
the document management service is also a service to which the user may store documents;
the graphical overlay permits the user to cause the multifunction device to scan a document and select a location of the document management service at which the scanned document will be stored; and
the second application also causes, in response to user selection of a scan function:
the multifunction device to scan a physical document to an electronic scan file, and
the system to transmit the electronic scan file to the document management service to be stored at the selected location.

5. The system of claim 1, further comprising additional programming instructions that, when executed, will cause the processor to before launching the second application determine whether the user interface comprises a web application that includes the one or more user interaction fields that, when actuated, will initiate actions that are unrelated to operation of the print device, and if so, launch the second application that causes the display device to generate and output the graphical overlay that is at least in part displayed over the one or more of the user interaction fields.

6. The system of claim 1, wherein the graphical overlay that is at least in part displayed over one or more of the user interaction fields to prevent the user from actuating the one or more user interaction fields is invisible to a user.

7. The system of claim 1, wherein the graphical overlay that is at least in part displayed over one or more of the user interaction fields to prevent the user from actuating the one or more user interaction fields at least partially obscures the one or more of the user interaction fields.

8. The system of claim 1, wherein the one or more programming instructions that, when executed, will cause the processor to launch the second application that causes the display device to generate and output the graphical overlay comprises one or more programming instructions that, when executed, cause the processor to, via the second application, identify regions of the user interface that include the one or more of the user interaction fields by consulting a look-up table that includes a description of the user interface.

9. The system of claim 1, wherein at least a portion of the graphical overlay that is displayed over one or more of the user interaction fields includes a substitute user interaction field that, when actuated, causes the processor to close the first application and return to a home application.

10. The system of claim 1, wherein the user interaction field that permits the user to cause the print device to print a document is a user interaction field of the user interface output by the first application.

11. The system of claim 1, wherein the user interaction field that permits the user to cause the print device to print a document is a user interaction field of the graphical overlay generated by the second application.

12. The system of claim 1, wherein the display device is included in a kiosk device.

13. A method comprising, by a processor:
launching a first application that causes a display device to output a user interface via which a user may select a document to print via a print device in communication with the display device, wherein the user interface includes one or more user interaction fields that, when actuated, will initiate actions that are unrelated to operation of the print device; and
launching a second application that causes the display device to generate and output a graphical overlay that is at least in part displayed over one or more of the user interaction fields to prevent the user from actuating the one or more user interaction fields while presenting a user interaction field that permits the user to cause the print device to print a document.

14. The method of claim 13, further comprising, by the processor:
before launching the first application, launching a home application that causes the display device to display one or more document management service selection icons via which the user may select a document management service; and
wherein the launching of the first application is responsive to user selection of one of the document management service selection icons, and the user interface is to the document management service that corresponds to the selected icon.

15. The method of claim 14, wherein the document management service is a remote service via which the user may select the document to print from a collection of stored documents.

16. The method of claim 15, wherein:
the print device is a multifunction device that comprises a scanner; and
the document management service is also a service to which the user may store documents;
the graphical overlay permits the user to cause the multifunction device to scan a document and select a location of the document management service at which the scanned document will be stored; and
the second application also causes, in response to user selection of a scan function:
the multifunction device to scan a physical document to an electronic scan file, and
the system to transmit the electronic scan file to the document management service to be stored at the selected location.

17. The method of claim 13, further comprising, before launching the second application determining whether the user interface comprises a web application that includes the one or more user interaction fields that, when actuated, will initiate actions that are unrelated to operation of the print device, and if so, launching the second application that causes the display device to generate and output the graphical overlay that is at least in part displayed over the one or more of the user interaction fields.

18. The method of claim 13, wherein the graphical overlay that is at least in part displayed over one or more of the user interaction fields to prevent the user from actuating the one or more user interaction fields is invisible to a user.

19. The method of claim 13, wherein the graphical overlay that is at least in part displayed over one or more of the user interaction fields to prevent the user from actuating the one or more user interaction fields at least partially obscures the one or more of the user interaction fields.

20. The method of claim 13, wherein launching the second application that causes the display device to generate and output the graphical overlay comprises, via the second application, identifying regions of the user interface that include the one or more of the user interaction fields by consulting a look-up table that includes a description of the user interface.

21. The method of claim 13, wherein at least a portion of the graphical overlay that is displayed over one or more of the user interaction fields includes a substitute user interaction field that, when actuated, causes the processor to close the first application and return to a home application.

* * * * *